United States Patent
Nakashima et al.

(10) Patent No.: US 6,964,807 B2
(45) Date of Patent: Nov. 15, 2005

(54) WATER-METACHROMATIC LAMINATE, AND PROCESS FOR ITS PRODUCTION

(75) Inventors: Akio Nakashima, Tsushima (JP); Hisayoshi Kato, Aichi-ken (JP)

(73) Assignee: The Pilot Ink Co., Ltd., Aichi-ken (JP)

( * ) Notice: Subject to any disclaimer, the term of this patent is extended or adjusted under 35 U.S.C. 154(b) by 345 days.

(21) Appl. No.: 09/961,425

(22) Filed: Sep. 25, 2001

(65) Prior Publication Data

US 2002/0052161 A1 May 2, 2002

(30) Foreign Application Priority Data

Oct. 30, 2000 (JP) ........................................ 2000-329827

(51) Int. Cl.⁷ ............................................... B32B 23/08
(52) U.S. Cl. ..................... 428/199; 428/36.1; 428/36.2; 428/195.1; 428/201; 428/320.2; 428/321.3; 428/322.2; 428/323; 428/324; 434/393; 434/396; 106/31.36; 106/31.19; 503/201
(58) Field of Search ............................ 428/199, 195.1, 428/201, 320.2, 321.3, 322.2, 323, 324, 36.1, 36.2; 434/393, 396; 106/498, 31.16, 31.19; 503/201

(56) References Cited

U.S. PATENT DOCUMENTS

| | | | | |
|---|---|---|---|---|
| 4,082,118 A | * | 4/1978 | Nims ........................ 139/144 |
| 4,810,562 A | * | 3/1989 | Okawa et al. ............... 428/199 |
| 5,163,846 A | | 11/1992 | Lee .............................. 434/408 |
| 5,879,443 A | * | 3/1999 | Senga et al. ................. 106/498 |
| 6,416,853 B1 | * | 7/2002 | Nakashima et al. ...... 428/313.9 |
| 6,468,088 B1 | * | 10/2002 | Fujita et al. ................ 434/295 |

FOREIGN PATENT DOCUMENTS

| | | | |
|---|---|---|---|
| EP | 1091039 A2 | * 4/2001 | ............. D06P/1/00 |
| JP | 58-199185 | 11/1983 | |
| JP | 58199185 A | * 11/1983 | ............. B41M/3/00 |
| JP | 2-074688 | 3/1990 | |

OTHER PUBLICATIONS

The Concise Oxford Dictionary of Current English, Oxford University Press, pp. 1116 and 1171.*

* cited by examiner

Primary Examiner—Rena Dye
Assistant Examiner—Tamra L. Dicus
(74) Attorney, Agent, or Firm—Fitzpatrick Cella, Harper & Scinto

(57) ABSTRACT

On a support, a porous resin layer which is opaque in a water-unabsorbed state and capable of turning transparent in a water-absorbed state is formed, and also a water-repellent resin layer is so provided as to exist in the porous resin layer at its some area or areas in a co-existent state, to make up a water-metachromatic laminate. A novel toy element can be provided in which latent images standing invisible in a normal condition are rendered visible by means of water as a medium so as to be visually distinguished.

11 Claims, 4 Drawing Sheets

WATER-METACHROMATIC LAMINATE, AND PROCESS FOR ITS PRODUCTION

This application claims the benefit of Japanese Patent applications No. 2000-174140 and No. 2000-329827 which are hereby incorporated by reference.

BACKGROUND OF THE INVENTION

1. Field of the Invention

This invention relates to a water-metachromatic laminate and a process for its production. More particularly, it relates to a water-metachromatic laminate in which an image standing latent in a normal condition is rendered visible by means of water as a medium so as to be visually distinguished, and a process for its production.

2. Related Background Art

Coated papers or sheets comprising a support and laminated thereto a porous resin layer containing a low-refractive-index pigment, into the porous resin layer of which a liquid such as water is absorbed to make it transparent to cause a background color tone to appear, are disclosed in the past (e.g., Japanese Patent Publications No. 50-5097 and No. 5-15389).

SUMMARY OF THE INVENTION

An object of the present invention is to provide a water-metachromatic laminate in which, utilizing the properties of the above porous resin layer, latent images standing invisible in a normal condition are rendered visible by means of water as a medium so as to be visually distinguished, and to be usable as a toy and enjoyable in unexpectedness, decorativeness and detectability so that it is applicable to a variety of fields of toys, doll clothing, teaching materials, picture books, picture coloring, artificial flowers, clothing, swimsuit, umbrellas, raincoats, rainproof shoes and other rainware, and to provide an effective process for producing such a water-metachromatic laminate.

To achieve the above object, the present invention provides a water-metachromatic laminate comprising a support and superposingly provided thereon i) a porous resin layer which is formed of a binder resin to which a low-refractive-index pigment stands fixed dispersedly, and is opaque in a water-unabsorbed state and capable of turning transparent in a water-absorbed state and ii) a water-repellent resin layer so provided as to exist in the porous resin layer at its some area or areas in a co-existent state; the porous resin layer being so made up that its area or areas not provided with the water-repellent resin layer turn(s) transparent in a water-absorbed state so that the both layers are visually distinguishable.

DESCRIPTION OF THE PREFERRED EMBODIMENTS

The present invention is described below with reference to the accompanying drawings (see FIG. 1 through FIGS. 10A and 10B).

The present invention is a water-metachromatic laminate 1 comprising a support 2 and superposingly provided thereon i) a porous resin layer 3 which is formed of a binder resin to which a low-refractive-index pigment stands fixed dispersedly, and is opaque in a water-unabsorbed state and capable of turning transparent in a water-absorbed state and ii) a water-repellent resin layer 4 so provided as to exist in the porous resin layer 3 at its some area or areas in a co-existent state; the porous resin layer 3 being so made up that its area or areas not provided with the water-repellent resin layer 4 turn(s) transparent in a water-absorbed state so that the both layers 3 and 4 are visually distinguishable.

In preferred embodiments, at least one of the porous resin layer 3 and the water-repellent resin layer 4 may comprise any image or images selected from a letter, a mark or sign, an Arabic or Roman numeral, a spot, a line and a design; a colored layer may be provided between the surface of the support 2 and the porous resin layer 3; another colored layer 51 may be provided on the water-repellent resin layer 4; the colored layer 51 may comprise any image or images selected from a letter, a mark or sign, an Arabic or Roman numeral, a spot, a line and a design; the low-refractive-index pigment may comprise a fine-particle silicic acid and the binder resin may be selected from urethane resins; the low-refractive-index pigment may comprise a fine-particle silicic acid produced by a wet process and may be formulated in the porous resin layer 3 in a proportion of from 1 to 30 g/m$^2$; the support 2 may comprise a cloth; and the cloth may be made water-repellent.

The present invention is also a process for producing a water-metachromatic laminate, comprising the steps of;

providing a porous resin layer 3 on a support 2; and thereafter applying onto the porous resin layer 3 a water-repelling solution containing a water-repellent resin, by a printing, coating, spraying, writing or stamping means to make the water-repelling solution adhere to the porous resin layer 3 and penetrate thereinto;

followed by drying to form a water-repellent resin layer 4 existing in the porous resin layer 3 in a co-existent state.

The above support 2 may be in the form of a sheet made of a material of various types such as paper, synthetic paper, rubber, plastic, metal (such as aluminum), stone, glass and cloth. Without limitations thereto, cubic or undulating shapes made of various water-resistant materials are also effective.

Incidentally, on the back of the support 2, a general-purpose adhesive used for pressure-sensitive adhesive sheets may be coated so that it may function as a pressure-sensitive adhesive sheet.

The low-refractive-index pigment may include fine-particle silicic acid, baryte powder, precipitated barium sulfate, barium carbonate, precipitated calcium carbonate, gypsum, clay, talc, alumina white and basic magnesium carbonates. These are pigments having a refractive index in the range of from 1.4 to 1.7 and exhibit good transparency upon absorption of water or the like.

There are no particular limitations on the particle diameter of the low-refractive-index pigment. Those having particle diameters of from 0.03 to 10.0 μm may preferably be used.

The low-refractive-index pigment may also be used in combination of two or more types.

As a low-refractive-index pigment used preferably, it includes fine-particle silicic acid.

The fine-particle silicic acid is produced as non-crystalline, amorphous silicic acid. According to its production process, it is roughly grouped into a dry-process product obtained by gaseous-phase reaction such as thermal decomposition of a silicon halide such as silicon tetrachloride (hereinafter "dry-process fine-particle silicic acid") and a wet-process fine-particle silicic acid obtained by liquid-phase reaction such as decomposition of sodium silicate with an acid (hereinafter "wet-process fine-particle silicic acid"). Either may be used, but the wet-process fine-particle silicic acid is more preferably used because, when it is used, it has a higher hiding performance in a normal condition than the system of dry-process fine-particle silicic acid and hence the binder resin can be mixed in a larger proportion to the fine-particle silicic acid to enable improvement in film strength of the porous resin layer 3 itself.

As the fine-particle silicic acid used to satisfy the hiding performance of the porous resin layer 3 in a normal condition, the wet-process fine-particle silicic acid is preferred as stated above. This is because the dry-process fine-particle silicic acid and the wet-process fine-particle silicic acid differ in structure from each other. The dry-process fine-particle silicic acid forms a three-dimensional structure as shown below in which silicic acid stands combined closely;

whereas the wet-process fine-particle silicic acid has what is called two-dimensional structure moiety as shown below in which silicic acid is condensed to form a long molecular arrangement.

Thus, the wet-process fine-particle silicic acid has a coarser molecular structure than the dry-process fine-particle silicic acid, and hence, when used in the porous resin layer, the wet-process fine-particle silicic acid can provide superior irregular light reflection properties in a dried state compared with a system making use of the dry-process fine-particle silicic acid, thus bringing about a great hiding performance in a normal condition, as so presumed.

The medium chiefly absorbed in the porous resin layer 3 is water. Accordingly, as the low-refractive-index pigment contained therein, the wet-process fine-particle silicic acid has more hydroxyl groups present on particle surface as silanol groups than the dry-process fine-particle silicic acid, and is preferably used because it has an appropriate hydrophilicity.

In the case when the wet-process fine-particle silicic acid is used as the low-refractive-index pigment, in order to satisfy both the hiding performance in normal condition and the transparency in liquid-absorbed condition, it may preferably be in a coating weight of from 1 g/m² to 30 g/m², and more preferably from 5 g/m² to 20 g/m², which may depend on the type of the wet-process fine-particle silicic acid and its properties such as particle diameter, specific surface area and oil absorption. If it is less than 1 g/m², it is difficult to obtain a sufficient hiding performance in normal condition. If on the other hand it is more than 30 g/m², it is difficult to obtain a sufficient transparency in liquid-absorbed condition.

The low-refractive-index pigment is dispersed in a vehicle containing a binder resin as a binding agent, to form a dispersion ink, which is then coated on the surface of the support 2 by a means such as printing, coating or spraying to form the porous resin layer 3.

The binder resin may include urethane resins, nylon resins, viny acetate resins, acrylate resins, acrylate copolymer resins, acryl polyol resins, vinyl chloride-vinyl acetate copolymer resins, maleic acid resins, polyester resins, styrene resins, styrene copolymer resins, polyethylene resins, polycarbonate resins, epoxy resins, styrene-butadiene copolymer resins, acrylonitrile-butadiene copolymer resins, methyl methacrylate-butadiene copolymer resins, butadiene resins, chloroprene resins, melamine resins, and emulsions of these resins, as well as casein, starch, cellulose derivatives, polyvinyl alcohol, urea resins, and phenolic resins.

In particular, it is effective to use urethane resins, or resins incorporated at least with urethane resins.

Incorporation of a urethane resin in the binder resin enables improvement in film strength of the porous resin layer 3, thus the layer can be used for various purposes which require durability, and also its hiding performance in dried condition and transparency in liquid-absorbed condition are by no means damaged.

The urethane resins include polyester type urethane resins, polycarbonate type urethane resins and polyether type urethane resins. Two or more types of these may be used in combination. Also usable are urethane type emulsion resins prepared by emulsifying and dispersing any of the above resins in water, and colloidal dispersion type (ionomer type) urethane resins dissolved or dispersed in water by self-emulsification without requiring any emulsifier on account of ionic groups of urethane resin itself (urethane ionomer) having ionic properties.

As the above urethane type resins, either of water-soluble urethane resins and oil-soluble urethane resins may be used. Preferably usable in the present invention are water-soluble urethane resins, in particular, urethane type emulsion resins and colloidal dispersion type urethane resins. The urethane resins may be used alone or in combination. Other binder resins may also be used in combination, in accordance with the material and form of the support 2 or the performance required in films. In the case when a binder resin other than the urethane resin is used, the urethane resin may preferably be incorporated in the binder resin of the porous resin layer 3 in an amount of 30% or more as weight ratio of solid content, in order to attain practical film strength.

In the porous resin layer 3 thus formed, a conventionally known metalescent pigment such as titanium-dioxide-coated mica, iron-oxide/titanium-dioxide-coated mica, iron-oxide-coated mica, guanine, sericite, basic lead carbonate, acid lead arsenate or bismuth oxychloride may be added or a common dye or pigment, a fluorescent dye or a fluorescent pigment may be mixed so that changes in color can be made rich in variety. A reversible thermochromic pigment, which is capable of reversibly changing in color (reversible metachromatism) upon temperature changes, may also be mixed.

The water-repellent resin layer 4 is a layer which exists in the porous resin layer 3 in a co-existent state, formed by applying onto the porous resin layer 3 a water-repelling solution containing a water-repellent resin, to make the water-repelling solution adhere to the porous resin layer 3 and penetrate thereinto so as to form an image in an appropriate form, followed by drying; the water-repellent resin being selected from water-repellent resins such as silicon types, paraffin types, polyethylene types, alkylethylene urea types and fluorine types.

Of the above water-repellent resins, fluorine type water-repellents are effective in view of water-repellent effect and working suitability, and may effectively be applied in a coverage ranging from 1 g/m$^2$ to 50 g/m$^2$, and preferably from 2 g/m$^2$ to 30 g/m$^2$.

The colored layer 5 is a layer formed directly on the surface of the support 2, and is seen through the porous resin layer 3 being in a water-absorbed state, to improve visual effect. The colored layer 5 is by no means limited to a solid-printed layer, and may also comprise an appropriate image. It is also by no means limited to a layer formed of a coloring material containing any general-purpose dye or pigment, and may also be a reversible thermochromic layer formed of a coloring material containing a reversible thermochromic material. Incidentally, the support 2 itself may be a layer standing colored in which the general-purpose colorant or reversible thermochromic material has been blended.

The colored layer 51 provided on the water-repellent resin layer 4 functions to make images visible in a greater variety.

As the above reversible thermochromic material capable of providing reversible thermochromic properties, usable is, e.g., a reversible thermochromic composition containing three components which are an electron-donating color-developing organic compound, an electron-accepting compound and an organic compound medium capable of causing the color-developing reaction of the above both compounds to take place reversibly. Also usable are liquid crystal, $Ag_2HgI_4$, and $Cu_2HgI_4$.

As the above reversible thermochromic composition containing three components which are an electron-donating color-developing organic compound, an electron-accepting compound and an organic compound medium capable of causing their color-developing reaction to take place reversibly, it may specifically include those disclosed in Japanese Patent Publications No. 51-35414, No. 51-44706, No. 51-44708, No. 52-7764 and No. 1-29398 and Japanese Patent Application Laid-Open No. 7-186546. These materials change in color at about a given temperature (color-changing point) making a border, and in the normal temperature region can only exist in any one specific state of both states before and after their color change. More specifically, these are of a type that shows what is called a small hysteresis width ($\Delta H$) on temperature/color density due to changes in temperature to cause metachromatism, in which the other state is maintained so long as the heat or cold that is required for them to come into that state is applied, but returns to the state shown in the normal temperature region once the heat or cold becomes not applied.

Also effective are those disclosed in Japanese Patent Publication No. 4-17154, Japanese Patent Applications Laid-Open No. 7-179777, No. 7-33997 and so forth, which have been proposed by the present applicant. These are thermochromic color memorizable compositions that show great hysteresis characteristics to cause metachromatism, i.e., metachromatci materials of a type capable of changing in color following courses which are greatly different in shape of curves formed by plotting changes in coloring density due to changes in temperature, between a case where the temperature is raised from the side of a temperature lower than a color-changing temperature region and a case where inversely the temperature is dropped from the side of a temperature higher than the color-changing temperature region, and having a characteristic feature of capable of memorizing a state changed at a low-temperature side color-changing point or below or at a high-temperature side color-changing point, in the normal temperature region between the low-temperature side color-changing point and the high-temperature side color-changing point.

The composition may also include, as heat-color-developing type thermochromic compositions, which are capable of developing a color upon heating from the color-extinguished state, systems in which a specific alkoxyphenolic compound having a straight-chain or side-chain alkyl group having 3 to 18 carbon atoms is used as the electron-accepting compound (Japanese Patent Applications Laid-Open No. 11-129623 and No. 11-5973) and systems in which a specific hydroxybenzoic ester is used (Japanese Patent Application Laid-Open No. 2001-105732), which have been proposed by the present applicant.

The reversible thermochromic composition containing three components which are an electron-donating color-developing organic compound, an electron-accepting compound and an organic compound medium capable of causing their color-developing reaction to take place reversibly as described above can be effective even when used as it is, and may preferably be used as a microcapsule pigment which encloses the composition in microcapsules. Namely, this is because the reversible thermochromic composition can be kept to have the same composition under various use conditions and can have the same operation and effect.

In the case when it is enclosed in microcapsules, a chemically and physically stable pigment composition can be made up. Practical utility can be satisfied when the microcapsules have a particle diameter ranging from 0.1 to 50 $\mu$m, preferably from 0.1 to 30 $\mu$m, and more preferably from 1 to 20 $\mu$m.

The thermochromic material may be formed into such microcapsules by conventionally known methods such as interfacial polymerization, in situ polymerization, cure-in-liquid coating, phase separation from aqueous solution, phase separation from organic solvent, melt-diffusion cooling, air-suspension coating, and spray drying, any of which may appropriately be selected according to uses. Also, when put into practical use, the surfaces of the microcapsules may be endowed with durability according to purposes by further forming secondary resin coatings thereon, or their surface properties may be modified.

The water-metachromatic laminate 1 of the present invention operates as described below, on account of the constituent factors described above.

The porous resin layer 3 is opaque in a water-unabsorbed state and capable of turning transparent in a water-absorbed state, so that aspects of an underlying layer can be seen through that layer. Hence, in a system in which the colored layer 5 is provided as the underlying layer, its color or images can be seen, and, in a system in which the colored layer 5 is not provided, the color of the support itself can be seen. Here, the water-repellent resin layer 4 is so provided as to exist in the porous resin layer 3 at its some area or areas in a co-existent state, and hence the porous resin layer 3 at the area or areas where the water-repellent resin layer 4 co-exists does not form the water-absorbed state because of the latter's water-repellent effect, and the opaque state is kept there. (Since the water-repellent resin layer 4 is transparent, the opaque state of the porous resin layer 3 can be identified.)

Thus, the water-repellent resin layer 4 and the porous resin layer 3 which are hardly distinguishable in a normal condition (water-unabsorbed state), become distinguishable upon absorption of water into the porous resin layer 3 at its part where the water-repellent resin layer 4 is not provided. This change in aspects is interchangeable.

The absorption of water into the porous resin layer 3 can be achieved by making any desired portion or portions wet by dipping in water, spraying of water or by a means such as a writing brush, a brush, a pen or a stamp.

In a system in which the reversible thermochromic material is used, changes in color caused by changing environmental temperature or by heating or cooling can be seen, making aspects of changes rich in variety.

The present invention secondly relates to an effective production process for the water-metachromatic laminate 1 described above, and the process is characterized by;

providing the porous resin layer 3 on the support 2; and thereafter applying onto the porous resin layer 3 the water-repelling solution containing a water-repellent resin, by a printing, coating, spraying, writing or stamping means to make the water-repelling solution adhere to the porous resin layer 3 and penetrate thereinto;

followed by drying to form the water-repellent resin layer 4 existing in the porous resin layer 3 in a co-existent state.

In the foregoing, the printing means may be exemplified by screen printing, gravure printing and offset printing. In particular, the screen printing enables relatively easy formation of any desired images such as letters, marks or signs, Arabic or Roman numerals, spots, lines, designs and half-tone patterns according to purposes by regulating the opening percentage, pore diameter and line diameter of a screen, and is effective also in view of the regulation of thickness of the water-repellent resin layer 4 (i.e., the coating weight of the water-repelling solution).

The support used in the present invention is not limited to sheet-shaped one, and all of those having cubic or undulating shapes are effective. It is not limited to specific sheets shown in the following Examples.

EXAMPLES

The present invention will be described below in greater detail by giving Examples. In the following, "part(s)" means "part(s) by weight".

Figure 1:
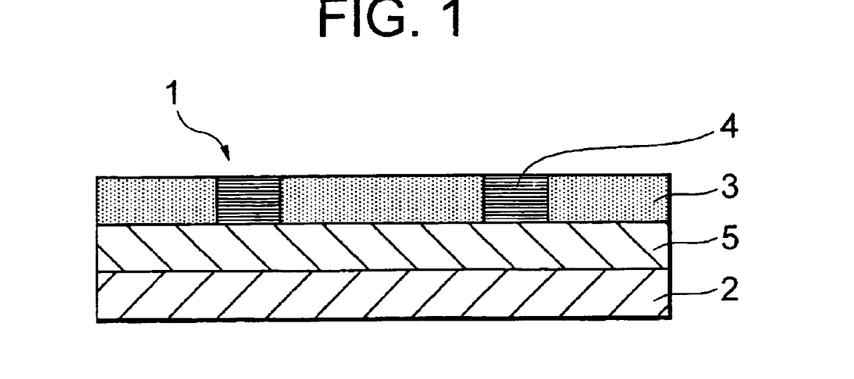
FIG. 1 is a vertical sectional illustration of an example of the water-metachromatic laminate of the present invention.
Figure 6A:
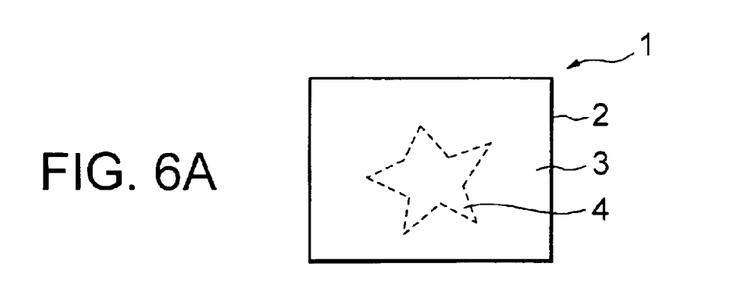
FIGS. 6A and 6B illustrate visual conditions in which the porous resin layer is in FIG. 6A a water-unabsorbed state and FIG. 6B a water-absorbed state in an example of the water-metachromatic laminate of the present invention.
Figure 6B:
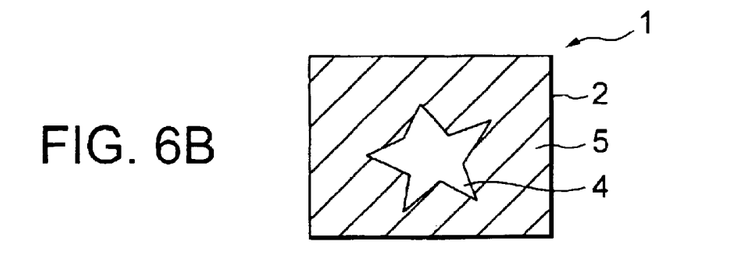

Example 1
(See FIGS. 1, 6A and 6B)

On the surface of a support 2 comprised of a white broad cloth of polyester and cotton (65%: 35%) mixed yarn, a fluorescent pink screen printing ink prepared by uniformly mixing and stirring 15 parts of a fluorescent pink pigment, 50 parts of an acrylic-ester emulsion, 3 parts of a water-based ink thickening agent, 0.5 parts of a leveling agent, 0.3 part of an anti-foaming agent and 5 parts of a blocked-isocyanate type cross-linking agent was applied by solid-printing using a 120-mesh screen plate, followed by drying at 130° C. for 5 minutes to harden to form a colored layer 5.

Next, on the colored layer 5, a white screen printing ink prepared by uniformly mixing and stirring 15 parts of wet-process fine-particle silicic acid (trade name: NIPSIL E-220; available from Nippon Silica Industrial Co., Ltd.), 45 parts of a urethane emulsion (trade name: HYDRAN AP-10; available from Dainippon Ink & Chemicals, Incorporated; solid content: 30%), 40 parts of water, 0.5 part of a silicone type anti-foaming agent, 3 parts of a water-based ink thickening agent, 1 part of ethylene glycol and 3 parts of a blocked-isocyanate type cross-linking agent was applied over the whole surface by solid-printing using a 100-mesh screen plate, followed by drying at 130° C. for 5 minutes to harden to form a porous resin layer 3.

Next, from above the porous resin layer 3, a colorless transparent screen printing ink prepared by uniformly mixing and stirring 50 parts of a fluorine resin water repellent (trade name: NK GUARD NDN-7; available from Nikka Chemical Ind. Co., Ltd.; solid content: 22%), 1.5 parts of sodium alginate, 48.5 parts of water, 0.5 part of a silicone type anti-foaming agent and 5 parts of a blocked-isocyanate type cross-linking agent was applied using a 100-mesh screen plate to print a star-shaped pattern, followed by drying at 170° C. for 2 minutes to harden to form a star-shaped pattern water-repellent resin layer 4 in the porous resin layer 3, thus a water-metachromatic cloth (water-metachromatic laminate) 1 was obtained (see FIG. 1).

In the water-metachromatic cloth 1, the porous resin layer 3 is white in the normal condition (water-unabsorbed state) and the water-repellent resin layer 4 itself is colorless and transparent. Hence, the star-shaped pattern image formed by the both layers standing co-existent has a white color and is in the state of a latent image (see FIG. 6A).

Water was sprayed on the surface of the water-metachromatic cloth 1, whereupon the water-repellent resin layer 4 repelled the water and did not absorb it, and the porous resin layer 3 other than the part of the water-repellent resin layer 4 (a star-shaped pattern) absorbed the water to become transparent, so that a vivid fluorescent pink color attributable to the underlying colored layer 5 became visible. Thus, a white star-shaped pattern 4 and a background 5 with a fluorescent pink color appeared (see FIG. 6B).

In the state where the water had adhered, the cloth had the above aspect. Upon evaporation of the water therefrom, however, its whole surface again turned white and the star-shaped pattern 4 returned to the state of a latent image (FIG. 6A).

Example 2

Figure 2:
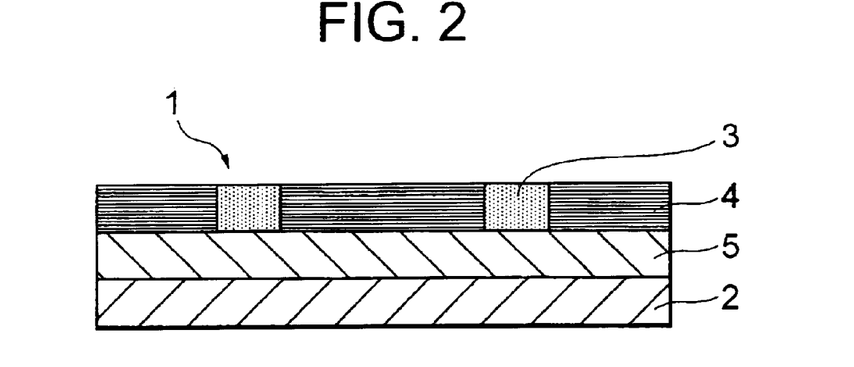
FIG. 2 is a vertical sectional illustration of another example of the water-metachromatic laminate of the present invention.
Figure 7A:
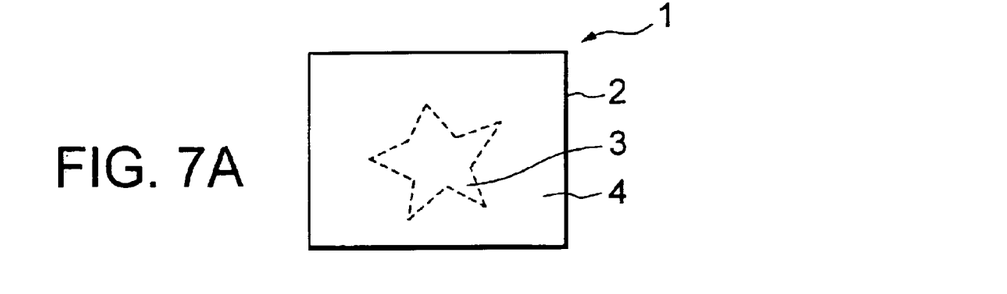
FIGS. 7A and 7B illustrate visual conditions in which the porous resin layer is in FIG. 7A a water-unabsorbed state and FIG. 7B a water-absorbed state in another example of the water-metachromatic laminate of the present invention.
Figure 7B:
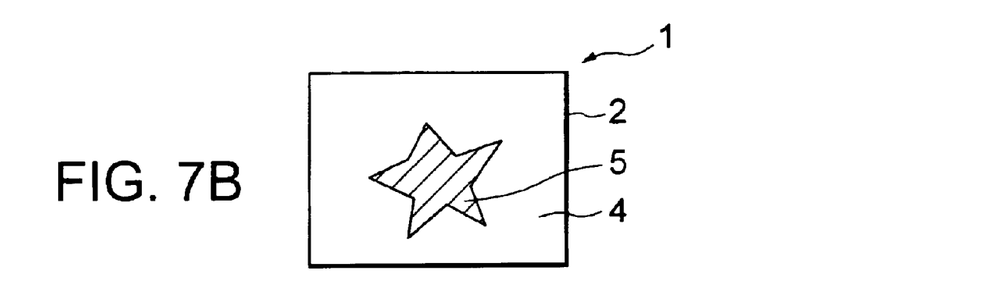

(See FIGS. 2, 7A and 7B)

As a support 2, a white broad cloth of polyester and cotton (65%: 35%) mixed yarn was used, and the same fluorescent pink screen printing ink as that in Example 1 was applied thereon by solid-printing using a 120-mesh screen plate, followed by drying at 130° C. for 5 minutes to harden to form a colored layer 5.

Next, on the colored layer 5, the same white screen printing ink as that in Example 1 was applied over the whole surface by solid-printing using a 100-mesh screen plate, followed by drying at 130° C. for 5 minutes to harden to form a porous resin layer 3.

Next, on the porous resin layer 3, a colorless transparent screen printing ink prepared by uniformly mixing and stirring 50 parts of a fluorine resin water repellent (trade name: NK GUARD NDN-7; available from Nikka Chemical Ind. Co., Ltd.; solid content: 22%), 1.5 parts of sodium alginate, 48.5 parts of water, 0.5 part of a silicone type anti-foaming agent and 5 parts of a blocked-isocyanate type cross-linking agent was applied using a 100-mesh screen plate to print a star-shaped blank pattern, followed by drying at 170° C. for 2 minutes to harden to form a water-repellent resin layer 4 (star-shaped blank pattern) in the porous resin layer 3, thus a water-metachromatic cloth (water-metachromatic laminate) 1 was obtained (see FIG. 2).

In the water-metachromatic cloth 1, the porous resin layer 3 is white in the normal condition (water-unabsorbed state) and the water-repellent resin layer 4 itself is colorless and transparent. Hence, the whole surface stands white and the star-shaped pattern is in the state of a latent image (see FIG. 7A).

Water was sprayed on the surface of the water-metachromatic cloth 1, whereupon the water-repellent resin layer 4 repelled the water and did not absorb it, and the porous resin layer 3 other than the part of the water-repellent resin layer 4 absorbed the water to become transparent, so that a vivid fluorescent pink color attributable to the underlying colored layer 5 became visible. Thus, a fluorescent pink star-shaped pattern (colored layer 5) and a white background (water-repellent resin layer 4) appeared (FIG. 7B).

In the state where the water had adhered, the cloth had the above aspect. Upon evaporation of the water therefrom, however, its whole surface again turned white and the star-shaped pattern returned to the state of a latent image (FIG. 7A).

Example 3

(No Figure)

As the support, on a white polyester tropical cloth having been subjected to water-repellent treatment, a fluorescent pink screen printing ink prepared by uniformly mixing and stirring 15 parts of a fluorescent pink pigment, 50 parts of an acrylic-ester emulsion, 3 parts of a water-based ink thickening agent, 0.5 parts of a leveling agent, 0.3 part of an anti-foaming agent and 5 parts of an epoxy type cross-linking agent was applied over the whole surface by solid-printing using a 120-mesh screen plate, followed by drying at 100° C. for 5 minutes to harden to form a colored layer with a fluorescent pink color.

Next, on the colored layer, a blue screen printing ink prepared by uniformly mixing and stirring 15 parts of wet-process fine-particle silicic acid (trade name: NIPSIL E-1009; available from Nippon Silica Industrial Co., Ltd.), 5 parts of a blue pigment (trade name: SANDYE SUPER BLUE GLL; available from Sanyo Color Works, Ltd.), 45 parts of a urethane emulsion (trade name: HYDRAN AP-20; available from Dainippon Ink & Chemicals, Incorporated; solid content: 35%), 40 parts of water, 0.5 part of a silicone type anti-foaming agent, 3 parts of a water-based ink thickening agent, 1 part of ethylene glycol and 3 parts of a blocked-isocyanate type cross-linking agent was applied by solid-printing using a 100-mesh screen plate, followed by drying at 130° C. for 5 minutes to harden to form a porous resin layer which was pale blue in the normal condition.

Next, on the porous resin layer, a colorless transparent screen printing ink prepared by uniformly mixing and stirring 50 parts of a fluorine resin water repellent (trade name: ASAHI GUARD LD-6015; available from Meisei Chemical Works, Ltd.; solid content: 15%), 3 parts of a water-based ink thickening agent, 47 parts of water, 0.5 part of a silicone type anti-foaming agent and 5 parts of a blocked-isocyanate type cross-linking agent was applied using a 120-mesh screen plate to print a flower-shaped pattern formed of halftone dots, followed by drying at 170° C. for 2 minutes to harden to form a flower-shaped pattern water-repellent resin layer in the porous resin layer, thus a water-metachromatic cloth was obtained.

In the water-metachromatic cloth, the porous resin layer was pale blue in the normal condition (water-unabsorbed state) and the water-repellent resin layer was colorless and transparent. Hence, the whole had a pale blue aspect. Upon immersion in water, however, the porous resin layer other than the co-existent part of the water-repellent resin layer absorbed the water to become transparent, so that a violet color which was a mixed color of the fluorescent pink color of the underlying colored layer and the blue color of the porous resin layer became visible. Thus, a flower-shaped pattern presented by pale blue halftone dots was seen on the background with a violet color.

In the state where the porous resin layer had adsorbed water, the cloth had the above aspect. Upon evaporation of the water therefrom to become dry, however, its whole surface returned to the original pale blue color, and such changes in aspects were repeatedly reproducible.

Example 4

(No Figure)

As a support, on the whole surface of a red PET (polyethylene terephthalate) film (thickness: 100 μm), a white screen printing ink prepared by uniformly mixing and stirring 15 parts of wet-process fine-particle silicic acid (trade name: NIPSIL E-1011; available from Nippon Silica Industrial Co., Ltd.), 45 parts of a urethane emulsion (trade name: NEOREZ R-966; available from Abishia K. K.; solid content: 33%), 40 parts of water, 0.5 part of a silicone type anti-foaming agent, 3 parts of a water-based ink thickening agent, 1 part of ethylene glycol and 3 parts of a blocked-isocyanate type cross-linking agent was applied by solid-printing using a 80-mesh screen plate, followed by drying at 130° C. for 5 minutes to harden to form a porous resin layer.

Next, on the porous resin layer, a colorless transparent screen printing ink prepared by uniformly mixing and stirring 50 parts of a silicone resin water repellent (trade name: SM8707; available from Dow Corning Toray Silicone Co., Ltd.; solid content: 40%), 3 parts of polyethylene oxide, 47 parts of water and 5 parts of a metal type catalyst was applied using a 100-mesh screen plate to print a polka-dot pattern, followed by drying at 150° C. for 5 minutes to harden to form a polka-dot pattern water-repellent resin layer in the porous resin layer, thus a water-metachromatic film (water-metachromatic laminate) was obtained.

The water-metachromatic film had a white color over the whole in the normal condition. Upon immersion in water, however, the the porous resin layer other than the co-existent part of the water-repellent resin layer absorbed the water to become transparent, so that a red color of the support itself became visible. Thus, a white polka-dot pattern was seen on the background with a red color.

In the state where the porous resin layer had adsorbed water, the film had the above aspect. Upon evaporation of the water therefrom to become dry, however, its whole surface returned to the original white color, and such changes in aspects were repeatedly reproducible.

Figure 3:
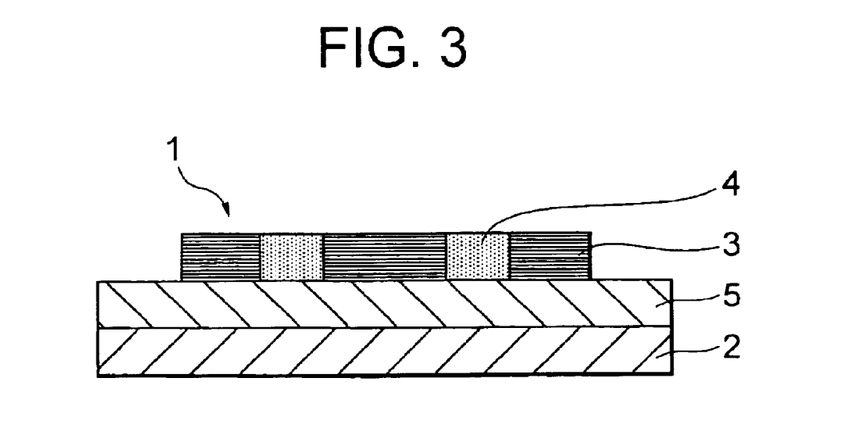
FIG. 3 is a vertical sectional illustration of still another example of the water-metachromatic laminate of the present invention.
Figure 8A:
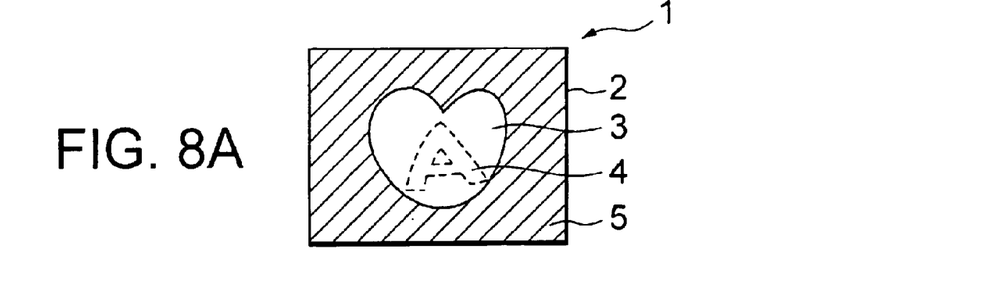
FIGS. 8A and 8B illustrate visual conditions in which the porous resin layer is in FIG. 8A a water-unabsorbed state and FIG. 8B a water-absorbed state in still another example of the water-metachromatic laminate of the present invention.
Figure 8B:
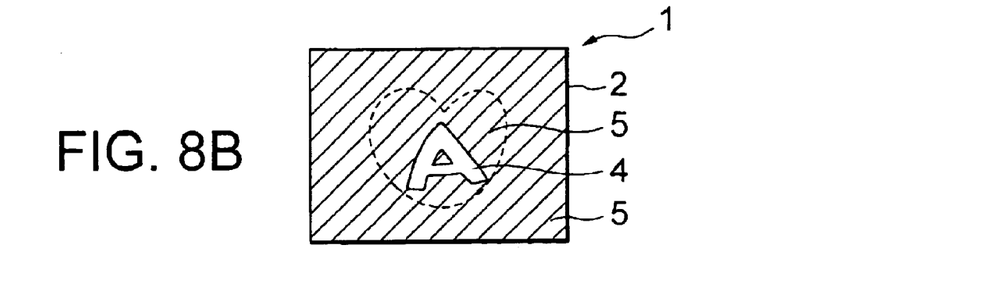

Example 5
(See FIGS. 3, 8A and 8B)

On a support 2 comprised of a white polyester tricot cloth, a green screen printing ink prepared by uniformly mixing and stirring 5 parts of a green pigment, 45 parts of an acrylic-ester emulsion, 0.5 part of a silicone type anti-foaming agent, 3 parts of a water-based ink thickening agent, 10 parts of water and 5 parts of a blocked-isocyanate type cross-linking agent was applied by solid-printing using a 150-mesh screen plate, followed by drying at 130° C. for 5 minutes to harden to form a colored layer 5 with a green color.

Next, on the colored layer 5, a white screen printing ink prepared by uniformly mixing and stirring 15 parts of wet-process fine-particle silicic acid (trade name: NIPSIL E-200; available from Nippon Silica Industrial Co., Ltd.), 45 parts of a urethane emulsion (trade name: HYDRAN AP-20; available from Dainippon Ink & Chemicals, Incorporated; solid content: 33%), 40 parts of water, 0.5 part of a silicone type anti-foaming agent, 3 parts of a water-based ink thickening agent, 1 part of ethylene glycol and 3 parts of a blocked-isocyanate type cross-linking agent was applied by solid-printing using a 80-mesh screen plate to print a heart-shaped pattern, followed by drying at 130° C. for 5 minutes to harden to form a porous resin layer 3.

Next, on the porous resin layer 3, a colorless transparent screen printing ink prepared by uniformly mixing and stirring 60 parts of a fluorine resin water repellent (trade name: LIFE GUARD FR-448; available from Kyoeisha Chemical Co., Ltd.; solid content: 30%), 45 parts of water, 5 parts of polyvinyl alcohol and 0.5 part of a silicone type anti-foaming agent was applied using a 100-mesh screen plate to print an alphabet letter "A", followed by drying at 170° C. for 2 minutes to harden to form a water-repellent resin layer 4 in the porous resin layer 3, thus a water-metachromatic cloth 1 was obtained (see FIG. 3).

Using the water-metachromatic cloth 1, a swimming suit of a doll was sewed to obtain a water-metachromatic toy-doll swimming suit.

In the water-metachromatic toy-doll swimming suit, the white heart-shaped pattern of the porous resin layer is seen with the green colored layer 5 for the background in the normal condition (FIG. 8A).

The swimming suit was made wet with water, whereupon the part other than the water-repellent resin layer 4 (the letter "A") existing in the white heart-shaped pattern became transparent, so that a green color became visible. Thus, the letter "A" was seen white (FIG. 8B).

The above aspect was retained when the porous resin layer was in the water-absorbed state. Upon evaporation of the water therefrom to become dry, however, the white heart-shaped pattern again became visible. Such changes in aspects were interchangeable, and were repeatedly reproducible.

Figure 4:
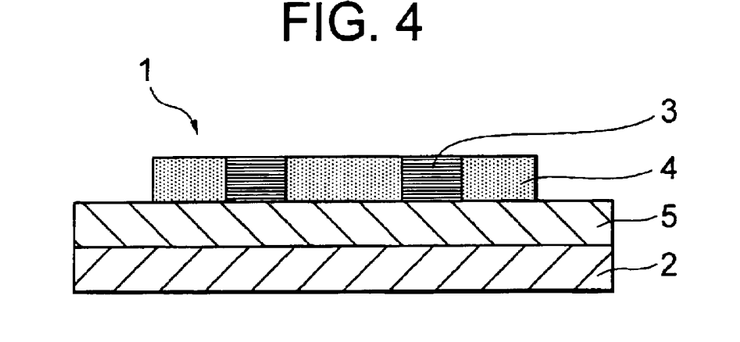
FIG. 4 is a vertical sectional illustration of a further example of the water-metachromatic laminate of the present invention.
Figure 9A:
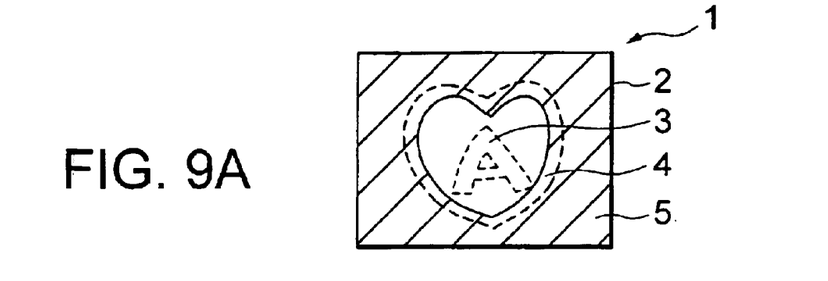
FIGS. 9A and 9B illustrate visual conditions in which the porous resin layer is in FIG. 9A a water-unabsorbed state and FIG. 9B a water-absorbed state in a further example of the water-metachromatic laminate of the present invention.
Figure 9B:
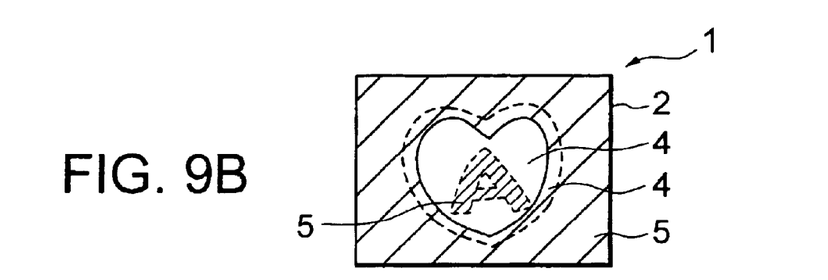

Example 6
(See FIGS. 4, 9A and 9B)

On a white polyester tricot cloth (support 2), a fluorescent orange screen printing ink prepared by uniformly mixing and stirring 10 parts of a fluorescent orange pigment, 45 parts of an acrylic-ester emulsion, 0.5 part of a silicone type anti-foaming agent, 3 parts of a water-based ink thickening agent, 10 parts of water and 5 parts of a blocked-isocyanate type cross-linking agent was applied by solid-printing using a 150-mesh screen plate, followed by drying at 130° C. for 5 minutes to harden to form a colored layer 5 with a fluorescent orange color.

Next, on the colored layer 5, a white screen printing ink prepared by uniformly mixing and stirring 15 parts of wet-process fine-particle silicic acid (trade name: NIPSIL E-200; available from Nippon Silica Industrial Co., Ltd.), 45 parts of a urethane emulsion (trade name: HYDRAN AP-10; available from Dainippon Ink & Chemicals, Incorporated; solid content: 30%), 40 parts of water, 0.5 part of a silicone type anti-foaming agent, 3 parts of a water-based ink thickening agent, 1 part of ethylene glycol and 3 parts of a blocked-isocyanate type cross-linking agent was applied by solid-printing using a 80-mesh screen plate to print a heart-shaped pattern, followed by drying at 130° C. for 5 minutes to harden to form a porous resin layer 3.

Next, on the porous resin layer 3, a colorless transparent screen printing ink prepared by uniformly mixing and stirring 45 parts of a fluorine resin water repellent (trade name: ASAHI GUARD AG-480; available from Meisei Chemical Works, Ltd.; solid content: 20%), 45 parts of water, 5 parts of a water-based ink thickening agent and 0.5 part of a silicone type anti-foaming agent was applied using a 100-mesh screen plate to print a heart-shaped pattern a little larger than the porous resin layer 3 (heart-shaped pattern), having at its central area a blank pattern of an alphabet letter "A", followed by drying at 170° C. for 2 minutes to harden to form a water-repellent resin layer 4, thus a water-metachromatic cloth 1 was obtained (see FIG. 4).

Using the water-metachromatic cloth 1, a swimming suit of a doll was sewed to obtain a water-metachromatic toy-doll swimming suit.

In the water-metachromatic toy-doll swimming suit, the white heart-shaped pattern is seen with the fluorescent orange colored layer 5 for the background in the normal condition (FIG. 9A).

The swimming suit was made wet with water, whereupon only the letter "A" became transparent, so that the white heart-shaped pattern became visible (FIG. 9B).

The above aspect was retained when the porous resin layer was in the water-absorbed state. Upon evaporation of the water therefrom to become dry, however, it returned to the aspect of the white heart-shaped pattern again. Such changes in aspects were interchangeable, and were repeatedly reproducible.

Example 7
(No Figure)

As a support, on a white broad cloth of polyester and cotton (65%: 35%) mixed yarn, a reversible thermochromic screen printing ink prepared by uniformly mixing and stirring 30 parts of a reversible thermochromic microcapsule pigment capable of turning colorless at 30° C. or above and turning blue at 28° C. or below, 5 parts of a fluorescent pink pigment, 50 parts of an acrylic-resin emulsion, 1 part of an anti-foaming agent, 4 parts of a water-based ink thickening agent, 15 parts of water and 5 parts of a blocked-isocyanate type cross-linking agent was applied by solid-printing using a 120-mesh screen plate, followed by drying at 130° C. for 5 minutes to harden to form a reversible thermochromic colored layer 5 capable of turning bluish violet at 30° C. or above and turning fluorescent pink at 28° C. or below.

Next, on the reversible thermochromic colored layer, a white screen printing ink prepared by uniformly mixing and stirring 15 parts of wet-process fine-particle silicic acid (trade name: NIPSIL E-220; available from Nippon Silica Industrial Co., Ltd.), 45 parts of a urethane emulsion (trade name: HYDRAN AP-10; available from Dainippon Ink & Chemicals, Incorporated; solid content: 30%), 40 parts of water, 0.5 part of a silicone type anti-foaming agent, 3 parts of a water-based ink thickening agent, 1 part of ethylene glycol and 3 parts of a blocked-isocyanate type cross-linking agent was applied over the whole surface by solid-printing using a 100-mesh screen plate, followed by drying at 130° C. for 5 minutes to harden to form a porous resin layer.

Next, on the porous resin layer, a colorless transparent screen printing ink prepared by uniformly mixing and stirring 50 parts of a fluorine resin water repellent (trade name: NK GUARD NDN-7; available from Nikka Chemical Ind. Co., Ltd.; solid content: 22%), 1.5 parts of sodium alginate, 48.5 parts of water, 0.5 part of a silicone type anti-foaming agent and 5 parts of a blocked-isocyanate type cross-linking agent was applied using a 100-mesh screen plate to print a star-shaped pattern, followed by drying at 170° C. for 2 minutes to harden to form a star-shaped pattern water-repellent resin layer so as to exist in the porous resin layer, thus a water-metachromatic cloth was obtained.

The water-metachromatic cloth had a white color over the whole surface in the normal condition (water-unabsorbed state). Water of 24° C. was sprayed on the surface of the cloth to make it wet, whereupon the water-repellent resin layer repelled the water and did not absorb it to stand white. On the other hand, the porous resin layer absorbed the water to become transparent, so that a bluish violet color attributable to the underlying reversible thermochromic colored layer was seen through and the background white star-shaped pattern became visible. Thereafter, upon evaporation of the water to become dry, its whole surface returned to the aspect of white color.

The water-metachromatic cloth was also immersed in warm water of 40° C., whereupon, in addition to the above changes in aspects, the reversible thermochromic colored layer changed from a blue color to a fluorescent pink color, and the white star-shaped pattern became visible on the background with a fluorescent pink color. It was taken out of the warm water and was left at about 20° C. room temperature, whereupon the background with a fluorescent pink color turned blue, and, with evaporation of the water to become dry, the whole surface again turned white. Such changes in aspects were repeatedly interexchangeably reproduced.

Example 8

(No Figure)

As a support, on a white polyester tricot cloth, a reversible thermochromic screen printing ink prepared by uniformly mixing and stirring 30 parts of a reversible thermochromic microcapsule pigment capable of turning colorless at 30° C. or above and turning pink at 28° C. or below, 50 parts of an acrylic-resin emulsion, 1 part of an anti-foaming agent, 5 parts of a water-based ink thickening agent, 10 parts of water and 5 parts of an ethylene-imine type cross-linking agent was applied by solid-printing using a 100-mesh screen plate, followed by drying at 100° C. for 5 minutes to harden to form a reversible thermochromic colored layer.

Next, on the reversible thermochromic colored layer, a white screen printing ink prepared by uniformly mixing and stirring 15 parts of wet-process fine-particle silicic acid (trade name: NIPSIL E-200; available from Nippon Silica Industrial Co., Ltd.), 45 parts of a urethane emulsion (trade name: HYDRAN AP-20; available from Dainippon Ink & Chemicals, Incorporated; solid content: 33%), 40 parts of water, 0.5 part of a silicone type anti-foaming agent, 3 parts of a water-based ink thickening agent, 1 part of ethylene glycol and 3 parts of a blocked-isocyanate type cross-linking agent was applied by solid-printing using a 80-mesh screen plate, followed by drying at 130° C. for 5 minutes to harden to form a porous resin layer.

Next, on the porous resin layer, a colorless transparent screen printing ink prepared by uniformly mixing and stirring 60 parts of a fluorine resin water repellent (trade name: LIFE GUARD FR-448; available from Kyoeisha Chemical Co., Ltd.; solid content: 30%), 45 parts of water, 5 parts of polyvinyl alcohol and 0.5 part of a silicone type anti-foaming agent was applied using a 100-mesh screen plate to print an alphabet letter "A", followed by drying at 170° C. for 2 minutes to harden to form a water-repellent resin layer in the porous resin layer, thus a water-metachromatic cloth was obtained.

The water-metachromatic cloth was cut and sewed to obtain a water-metachromatic toy-doll swimming suit. In this swimming suit, the pink color of the reversible thermochromic colored layer and the white heart-shaped pattern of the porous resin layer stood visible in the normal condition. The swimming suit was made wet with water of 24° C., whereupon the white heart-shaped pattern became transparent and changed into the pink color of the reversible thermochromic colored layer, and only the letter "A" became visible on the pink-color background. Upon evaporation of the water the porous resin layer had absorbed, swimming suit returned to the aspect of the white heart-shaped pattern on the pink-color background.

The water-metachromatic toy-doll swimming suit was also immersed in warm water of 40° C., whereupon the porous resin layer absorbed the water to become transparent and the reversible thermochromic colored layer also changed simultaneously from a pink color to become colorless, where the whole surface became white. It was taken out of the warm water and was left at about 20° C. room temperature, whereupon only the letter "A" became visible in white on the pink-color background from the state of the whole surface being white. Upon evaporation of the water from the cloth, the white heart-shaped pattern again appeared on the pink-color background. Such changes in aspects were repeatedly interexchangeably reproduced.

Example 9

Figure 5:
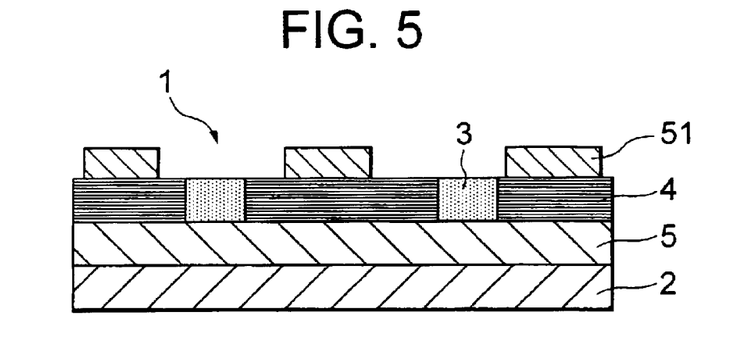
FIG. 5 is a vertical sectional illustration of a still further example of the water-metachromatic laminate of the present invention.
Figure 10A:
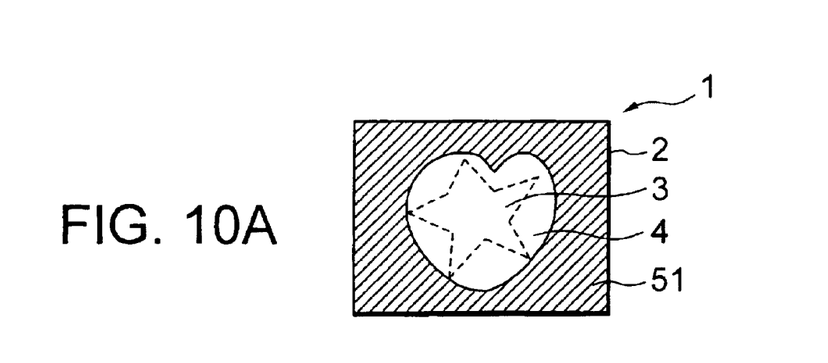
FIGS. 10A and 10B illustrate visual conditions in which the porous resin layer is in FIG. 10A a water-unabsorbed state and FIG. 10B a water-absorbed state in a still further example of the water-metachromatic laminate of the present invention.
Figure 10B:
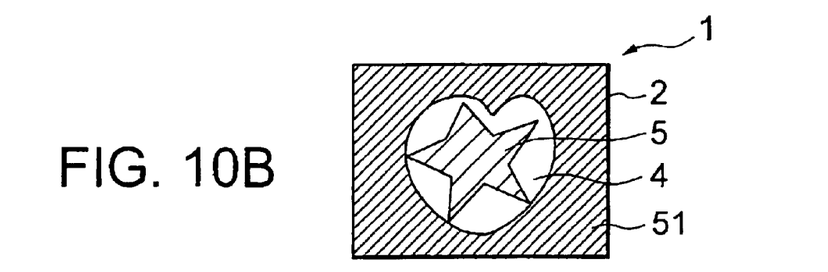

(See FIGS. 5, 10A and 10B)

On a support 2 comprised of a white polyester satin cloth, a green screen printing ink was applied by solid-printing using a 120-mesh screen plate, followed by drying at 130° C. for 5 minutes to harden to form a colored layer 5.

Next, on the colored layer 5, the same white screen printing ink as that in Example 1 was applied over the whole surface by solid-printing using a 100-mesh screen plate, followed by drying at 130° C. for 5 minutes to harden to form a porous resin layer 3.

Next, on the porous resin layer 3, the same colorless transparent screen printing water-repelling ink as that in Example 1 was applied using a 100-mesh screen plate to print a star-shaped blank pattern, followed by drying at 170° C. for 2 minutes to harden to form a star-shaped blank pattern (water-repellent resin layer 4) in the porous resin layer 3. Thereafter, using the same fluorescent pink screen printing ink as that in Example 1, a heart-shaped blank pattern having a space large enough to allow the star-shaped blank pattern to exist therein (on its surrounding, the pink-color colored layer 51 was formed) was printed making registration (positional adjustment) so that the star-shaped blank pattern existed therein, thus a water-metachromatic cloth (water-metachromatic laminate) 1 was obtained (see FIG. 5).

In the water-metachromatic cloth 1, the white heart-shaped pattern (attributable to the porous resin layer 3) was seen with the pink color (colored layer 51) for the background in the normal condition (water-unabsorbed state). Water was sprayed thereon to make it wet, whereupon a green star-shaped pattern (colored layer 5) appeared from the inside of the white heart-shaped pattern. The cloth had this aspect when it was kept wet, but once it became dry, the green star-shaped pattern disappeared and changed into the white heart-shaped pattern to return to the original state (see FIGS. 10A and 10B).

The above changes in aspects were repeatedly reproducible.

As described above, according to the water-metachromatic laminate of the present invention, latent images standing invisible in the normal condition can be rendered visible as colored images by means of water as a medium. Especially on account of the effects attributable to both the co-existence of the water-repellent resin layer (image) and the layer-by-layer printing, a variety of images can interchangeably be made to be seen. Thus, new utility as a toy and unexpectedness, decorativeness and detectability can be imparted so that the product is applicable to a variety of fields of toys, doll clothing, teaching materials, picture books, picture coloring, artificial flowers, swimsuit, umbrellas, rainware and so forth.

Moreover, the application of the production process of the present invention enables simple formation of any desired images by the water-repellent resin layer which is formed by a printing means in the state it is existent in and co-existent with the porous resin layer.

What is claimed is:

1. A water metachromatic laminate comprising
a support superposingly provided thereon with i) a porous resin layer having a binder resin to which a low-refractive-index pigment stands fixed dispersedly, said porous resin layer being opaque in a water-unabsorbed state and turning transparent in a water-absorbed state and ii) an opaque water-repellent resin layer that does not absorb water and repels water on or within the porous resin layer, wherein
when no water is applied to said laminate, the entire laminate is opaque, and
when water is applied to said laminate, the porous resin layer absorbs said water and turns transparent and the water-repellant resin layer does not absorb said water and remains opaque.

2. The water metachromatic laminate according to claim 1, wherein at least one of the porous resin layer and the water repellent resin layer is an image selected from the group consisting of a letter, an Arabic or Roman numeral, a spot and a line.

3. The water metachromatic laminate according to claim 1, wherein a first colored layer is provided between the surface of the support and the porous resin layer.

4. The water metachromatic laminate according to claim 1, comprising a colored layer provided on the water repellent resin layer.

5. The water metachromatic laminate according to claim 4, wherein the colored layer is an image selected from a group consisting of a letter, an Arabic or Roman numeral, a spot and a line.

6. The water metachromatic laminate according to claim 1, wherein the low refractive index pigment comprises a fine particle silicic acid and the binder resin is a urethane resin.

7. The water metachromatic laminate according to claim 1 or 6, wherein the low refractive index pigment comprises a fine particle silicic acid produced by a wet process and is formulated in the porous resin layer in a proportion of from 1 to 30 g/m$^2$.

8. The water metachromatic laminate according to claim 1, wherein the support is a cloth.

9. The water metachromatic laminate according to claim 8, wherein the cloth is water repellent.

10. The water metachromatic laminate according to any one of claims 1-6, 8 and 9, wherein the water-repellant resin is a fluorine resin.

11. The water metachromatic laminate according to claim 7; wherein the water-repellant resin is a fluorine resin.

* * * * *

UNITED STATES PATENT AND TRADEMARK OFFICE
CERTIFICATE OF CORRECTION

PATENT NO. : 6,964,807 B2
DATED : November 15, 2005
INVENTOR(S) : Akio Nakashima et al.

It is certified that error appears in the above-identified patent and that said Letters Patent is hereby corrected as shown below:

Title page,
Item [56], References Cited, FOREIGN PATENT DOCUMENTS,
"58199185 A *      11/1983       B41M/3/00" should read
-- 58-199185 A *   11/1983       B41M/3/00 --.

Column 8,
Line 27, "0.5 parts" should read -- 0.5 part --.

Column 10,
Line 1, "0.5 parts" should read -- 0.5 part --.

Column 16,
Lines 2, 17, 22, 25, 28, 32, 35, 40, 42, 44 and 47, "water metachromatic" should read -- water-metachromatic --;
Line 2, "comprising" should read -- comprising: --;
Lines 15 and 48, "water-repellant" should read -- water-repellent --;
Line 18, "water" should read -- water- --;
Lines 26 and 45, "water repellant" should read -- water-repellent --;
Line 36, "low refractive index" should read -- low-refractive-index --;
Line 37, "fine particle" should read -- fine-particle --; and
Line 48, "7;" should read -- 7, --.

Signed and Sealed this

Ninth Day of May, 2006

JON W. DUDAS
*Director of the United States Patent and Trademark Office*